Feb. 16, 1932.  H. S. COLBY  1,845,239

HEAT EXCHANGER

Filed May 6, 1929

INVENTOR
Caldwell S. Colby
BY Nathaniel Frucht
his ATTORNEY

Patented Feb. 16, 1932

1,845,239

UNITED STATES PATENT OFFICE

HALDWELL S. COLBY, OF WELLSVILLE, NEW YORK

HEAT EXCHANGER

Application filed May 6, 1929. Serial No. 360,949.

This invention relates to regenerative air preheaters.

In preheaters of the regenerative type, hot gases, which may be flue gases, blast furnace gases, or the like, are passed through the regenerative passages to impart heat to the regenerative material; air to be heated is then passed through the passages to absorb the imparted heat from the regenerative material.
One difficulty in utilizing flue gases, blast furnace gases or the like, is due to the retention of heating gases in the regenerative passages when the heating gas flow is shut off, and the resultant admixing of these heating gases with the air to be heated. One feature of the present invention is the removal of the heating gases from the regenerator passages prior to the entrance of the air to be heated.
Another difficulty attendant to the use of heating gases of this type has been the deposit of soot, solid particles, and the like in the regenerative passages during the flow of heating gases therethrough, and the subsequent entraining of the soot and dirt in the clean air flowing through the same passages to be heated. Another feature of the present invention deals with the removal of such soot, dirt, and the like, from the regenerative passages prior to the entrance of the air to be heated.

Other features and advantages will be readily apparent from the detailed description following, in conjunction with the drawings, wherein.

Figure 1:
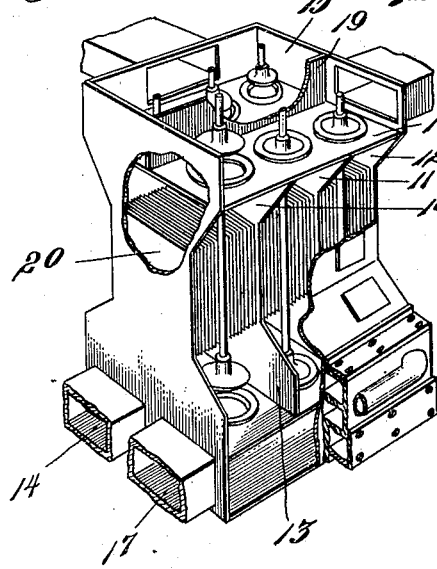
Figure 1 is a perspective view of a stationary type regenerative preheater, partly broken away.
Figure 2:
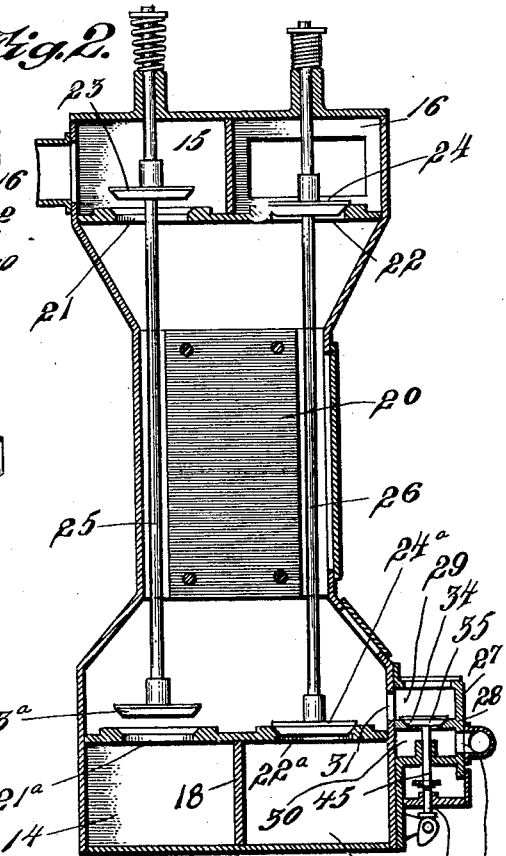
Figure 2 is an enlarged sectional view of a single regenerative chamber, showing the flow control valves.

Considering Figure 1, the preheater comprises a plurality of regenerative chambers 10, 11, and 12, separated by partition walls 13, and having a common heating gas inlet chamber 14, a cooled gas outlet chamber 15, a cool air inlet chamber 16, and a heated air outlet chamber 17, partitions 18 and 19 separating the air and gas chambers to provide air and gas flow passages having the regenerative chambers in common.

Within each regenerative chamber is regenerative material, shown in the preferred embodiment as metal plates 20 providing narrow flow passages therebetween for the gases and air. While I have shown plates, it is obvious that the regenerative material may be any material capable of absorbing heat from hot gases, and of transmitting heat to cool gases, flowing therethrough.

The lower walls of chambers 15, 16 and the upper walls of chambers 14, 17 are provided with a series of aligned openings 21, 21a and 22, 22a, communicating these chambers with the regenerative chambers 10, 11, and 12. The walls adjacent the openings 21, 21a, 22, 22a, are preferably formed as valve seats to co-operate with a series of valves 23, 23a, 24, 24a for controlling flow of gas and air through the regenerative chambers; these valves have common operating stems 25, 26 for insuring movement in unison.

Secured to the outer walls of the regenerative chambers, preferably adjacent the air outlet chamber 17, is a casing 27 having a horizontal partition 28 dividing it into two chambers 29, 30. Chamber 29 communicates with the interior of the regenerative chambers through a series of openings 31, and chamber 30 communicates with a suction conduit 32 through a series of openings 33. In the partition 28 is formed a series of valve seats 34 within which valves 35 operate to control communication of the two chambers 29, 30.

Figure 4:
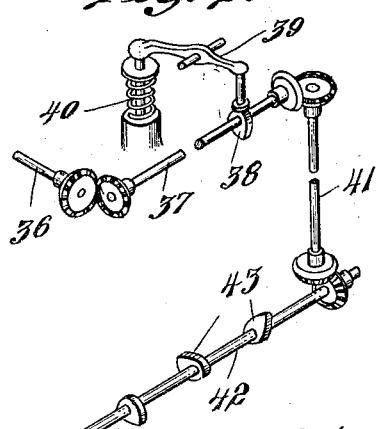
Figure 4 is a perspective view of one type of valve control mechanism.
Figure 3:
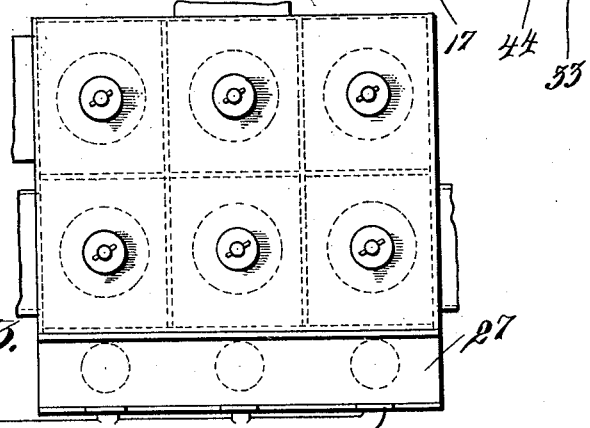
Figure 3 is a top plan view showing the relative position of the low pressure conduit; and

The valves 23, 23a, 24, 24a and 35 are preferably cam operated, one type of mechanism for effecting the desired actuation being shown in Figure 4. A main power shaft 36 operates two cam shafts 37 (one being shown in the figure) to periodically actuate the valves 23, 23a and 24, 24a through the usual cams 38 and over-head rocker arms 39 against the compression of springs 40. A vertical shaft 41, geared to the shaft 37, is geared to a horizontal shaft 42 which actuates cams 43 for periodically operating the valves 35 through the usual tappets 44 against the compression of spring 45.

The operation of the improved air preheater is as follows:

The hot gases enter through inlet chamber 14, pass through a regenerative chamber, for example 12, impart heat to the regenerative plates 20, and pass out through outlet 15, the valves 23, 23a being open and the valves 24, 24a and 35 being closed. After a predetermined time, the valves 23, 23a close; the valve 35 in the chamber then opens, and the low presure in suction manifold 32 begins to draw out the hot gases remaining in the chamber, and the solid particles and dirt deposited during the hot gas flow. Shortly thereafter, air flow control valves 24, 24a open, and the initial flow is sufficient to carry practically all the hot gas and dirt residue into the suction manifold before the valve 35 closes. The air then flows through the regenerative chamber and into the air outlet chamber 17.

In certain installations using very dirty hot gases, it may be necesary to install independently actuated air inlet and air outlet valves, and time the air valves to permit a short initial flow into the suction manifold while maintaining the outlet valves 24a closed, these valves then opening and the valves 35 simultaneously closing. Any well known form of separate valve actuation may be used. In practice, however, such independent actuation is not essential, and the valves 35 may be actuated to close at the same time valves 24, 24a open, or shortly thereafter, without resultant admixture of an appreciable amount of hot gases or dirt with the air.

If desired, vibrating mechanism (not shown) may be applied to the regenerative plates or their supporting mechanism, in order to dislodge deposited dirt or soot, and scavenging air under high pressure may be passed into the regenerative chambers through scavenging pipes (not shown) at the time the valves 35 are opened.

While I have described the invention as specifically applied to an air preheater, it is to be understood that the description is merely illustrative and that the invention may be applied to regenerative heat exchangers in general, within the scope of the appended claims.

I claim:

1. In a heat exchanger of the regenerative type, a series of compartments containing regenerative material, valves for alternately admitting heating gases and gases to be heated to said compartments, a low pressure conduit, and valves controlling communication of said chambers with said low pressure conduit.

2. In a heat exchanger of the regenerative type, a series of stationary compartments containing regenerative material, valves for alternately admitting heating gases and gases to be heated to said compartments, a suction manifold, and valves controlling communication of said chamber with said suction manifold.

3 In a heat exchanger of the regenerative type, a series of compartments containing regenerative material, valves for alternately admitting heating gases and air to be heated in to said compartment, a low pressure conduit, valves controlling communication of said chambers with said low pressure conduit, and means for operating the said valves to permit flow of heating gases through the chambers, to withdraw heating gas residue into the low pressure conduit, and to permit flow of gases to be heated, in the order named.

4. In a heat exchanger of the regenerative type, a series of stationary compartments containing regenerative material, valves for alternately admitting heating gases and air to be heated to said compartments, a suction manifold, valves controlling communication of said chambers with said suction manifold, and means for operating the said valves to permit flow of heating gases through the chambers, to withdraw heating gas residue into the low pressure conduit, and to permit flow of gases to be heated, in the order named.

Signed at Wellsville in the county of Allegany and State of New York this 25th day of April A. D. 1929.

HALDWELL S. COLBY.